March 8, 1966 — P. C. BROCKETT — 3,239,805
TRAFFIC DENSITY COMPUTER
Filed Sept. 11, 1961 — 2 Sheets-Sheet 1
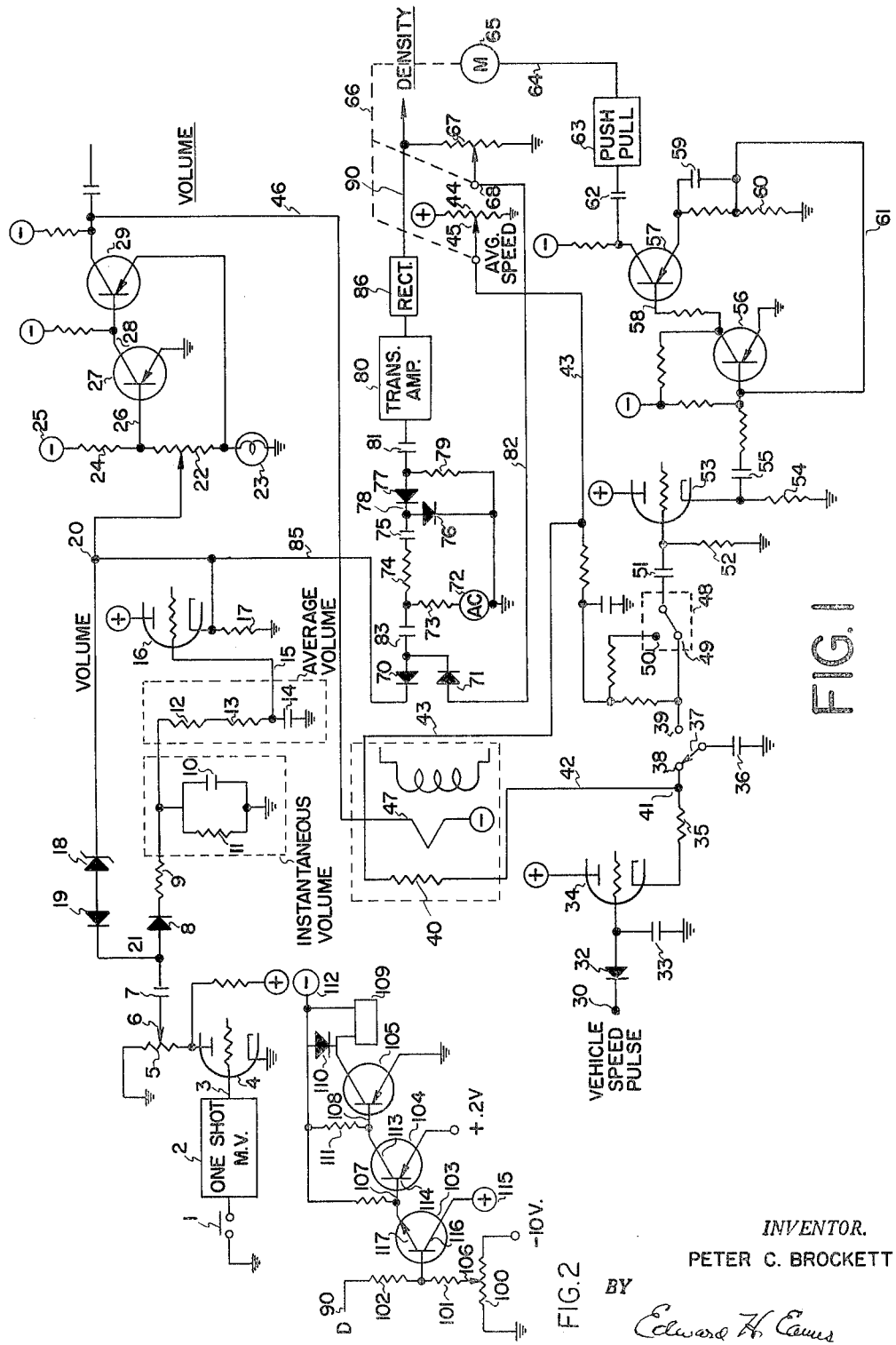
INVENTOR.
PETER C. BROCKETT
BY Edward H. Eames
ATTORNEY March 8, 1966  P. C. BROCKETT  3,239,805
TRAFFIC DENSITY COMPUTER
Filed Sept. 11, 1961  2 Sheets-Sheet 2

INVENTOR
PETER C. BROCKETT

BY Edward H. Eames
ATTORNEY

United States Patent Office 3,239,805
Patented Mar. 8, 1966

3,239,805
TRAFFIC DENSITY COMPUTER
Peter C. Brockett, Milford, Conn., assignor to Laboratory for Electronics, Inc., Boston, Mass., a corporation of Delaware
Filed Sept. 11, 1961, Ser. No. 137,354
2 Claims. (Cl. 340—31)

This invention relates to traffic measuring or control apparatus and more particularly relates to apparatus for measuring traffic for controlling traffic signals or other control or monitoring or indicating purposes.

One particular aspect of this invention relates to improved circuitry for measuring the rate of traffic flow per unit of time past a point (traffic volume) for providing a Traffic Volume electrical output signal which varies in value linearily over a wide range of such traffic volumes. In particular, this aspect of the invention provides apparatus for sensing passage of individual vehicles, continuously determining an electrical value representing the instantaneous rate of vehicle passage per unit of time (traffic volume), continuously averaging this instantaneous traffic volume value over a base which may be time period or distance of roadway to provide an electrical value representing the average traffic volume for this base, and feeding back a portion of this averaged traffic volume signal to raise the voltage level at the input of the volume circuitry to provide an equal effect for such vehicle at any level of volume.

This improved traffic volume circuit then cooperates through improved circuitry with a speed averaging circuit and improved circuitry for in effect dividing the volume by the speed for computing the traffic density in vehicles per unit distance along the roadway, which is an important factor in traffic monitoring or control.

In particular in one aspect, the invention provides the feedback through a cathode follower and a zener diode connected in cascade to provide a regenerative high impedance feedback circuit with a gain of less than one (1) which has a negligible effect on the average volume storage circuit while also providing a substantially constant voltage to the instantaneous volume circuit between vehicle actuations to restore any charge bucketed by the instantaneous circuit into the averaging circuit.

The Zener diode in this feedback circuit acts as a constant voltage drop or source so that the average volume voltage fed back to the input of the instantaneous volume circuit is less than the average volume at the cathode follower by an amount equal to the Zener voltage drop and therefore less than the instantaneous volume voltage. Thus the feedback voltage raises the level of voltage at the input of the instantaneous circuit without providing any charge path for such circuit so that rapid variations (either increasing or decreasing) in instantaneous volume may occur without providing regeneration as a result of the slower averaging circuit providing the feedback.

Another aspect of the invention relates to improved circuitry for continually measuring both traffic volume and traffic speed over a base time period or distance segment while assuring that both such measurements relate to the same vehicles. In particular, this aspect of the invention provides for continually sampling passing vehicles within a time or distance sampling segment of roadway in which vehicles continually pass in and out of such segment example, determining the instantaneous and/or average traffic volume of vehicles presently included within the sampling segment, providing an average traffic speed of the vehicles presently within this segment, and insuring that both the traffic volume and speed measurements are correlated to the same vehicles so that traffic density information may be mathematically derived from both of these measurements. A comparison circuit is provided for correlating the speed and volume and includes a thermistor which permits individual vehicle speed pulses to either increase or decrease the average traffic speed measurement of the vehicles within the segment linearily in proportion to the number of vehicles within the segment as represented by the traffic volume. To provide this linear relationship the invention provides a transistor feedback amplifier supplying the heater of the thermistor.

A still further aspect of the invention relates to traffic measuring apparatus which is subject to wide ranges of temperature variations and input signal values in which cascaded transistor amplifiers for such signals have degenerative feedback from the emitter of one to the base of a preceding one to provide constant gain independent of temperature and/or voltage variations for a wide range of input signals.

Certain aspects of measuring traffic volume or traffic speed or interrelating traffic speed and traffic volume are the subject of a copending divisional application Serial Number 419,155, filed December 17, 1964.

Accordingly an object of this invention is to provide an improved Traffic Density Computer.

Another object is to provide an improved Traffic Volume measuring circuit which is linear over a wide range of Traffic Volumes.

Another object is to provide an improved circuitry for measuring the average traffic speed of vehicles within a sampling segment, which has vehicles continually moving into and out of the sement, by varying the effect of a single vehicle speed pulse in modifying the average speed as a linear function of the number of vehicles presently included in such sampled segment.

Other objects are to provide improved circuitry amplifying traffic measurements and particularly such circuitry which is independent of temperature and voltage variations.

A further object is to provide improved circuitry which continually measures both the traffic volume and traffic speed of substantially the same group of vehicles within a common time or distance base representing a segment of traffic, with vehicles moving into and out of such segment, so that a continuous measure of traffic density within the segment may be provided.

A summary of the invention will be described as follows: Individual vehicles passing along a roadway are sensed to provide both passage and speed pulses. Such passage pulses are fed to a rate circuit which derives a voltage representing Traffic Volume. An instantaneous measure of such Volume is averaged over a time period (which may be selectable) so that the Average Volume measurement represents the vehicles which have passed a certain segment of traffic or of roadway in which new vehicles are continually being included within the segment and old vehicles are continually being dropped from such measurements so that the average volume measurements at any one instant represent the vehicles which have passed within a previous time period. To insure that this volume measurement is accurate, feedback through a zener diode is provided.

The individual speed pulses are stored in a condenser and are subsequently taken from that condenser and bucketed into a second condenser whose charge represents the average traffic speed. The amount of charge bucketed into the second condenser by each vehicle is controlled not only by the speed of that vehicle but also by the number of vehicles which are presently included in the sampling segment whose average speed is presently represented by the charge on this second condenser. This latter circuitry includes a thermistor which controls the amount of charge bucketed into the second condenser by the individual vehicle in proportion to the traffic volume.

Traffic Density in vehicles per mile is then derived by apparatus which effectively divides Volume by Speed. This apparatus includes a Servo Amplifier which compares the actual traffic volume with an assumed traffic volume. The Assumed Volume is derived from a tap point on a potentiometer; the position of the tap is controlled by the average speed circuit and therefore is a function of speed while the voltage across the potentiometer is the output of the servo amplifier and represents an Assumed Density. Any difference between the actual and assumed volume inputs is amplified to provide an output across the potentiometer representing actual Traffic Density while also correcting the unbalance at the input.

Since the amount of unbalance at the input of the Servo Amplifier is variable, degenerative feedback is provided to maintain a constant gain and to obtain temperature stability.

The above and other objects and advantages of this invention will be apparent from the following detailed disclosure and drawing of which:

FIG. 1 is a schematic drawing of a preferred form of Traffic Density measurement apparatus.

FIG. 2 illustrates a circuit controlled by the density voltage output of the measurement apparatus of FIG. 1.

Figure 3:
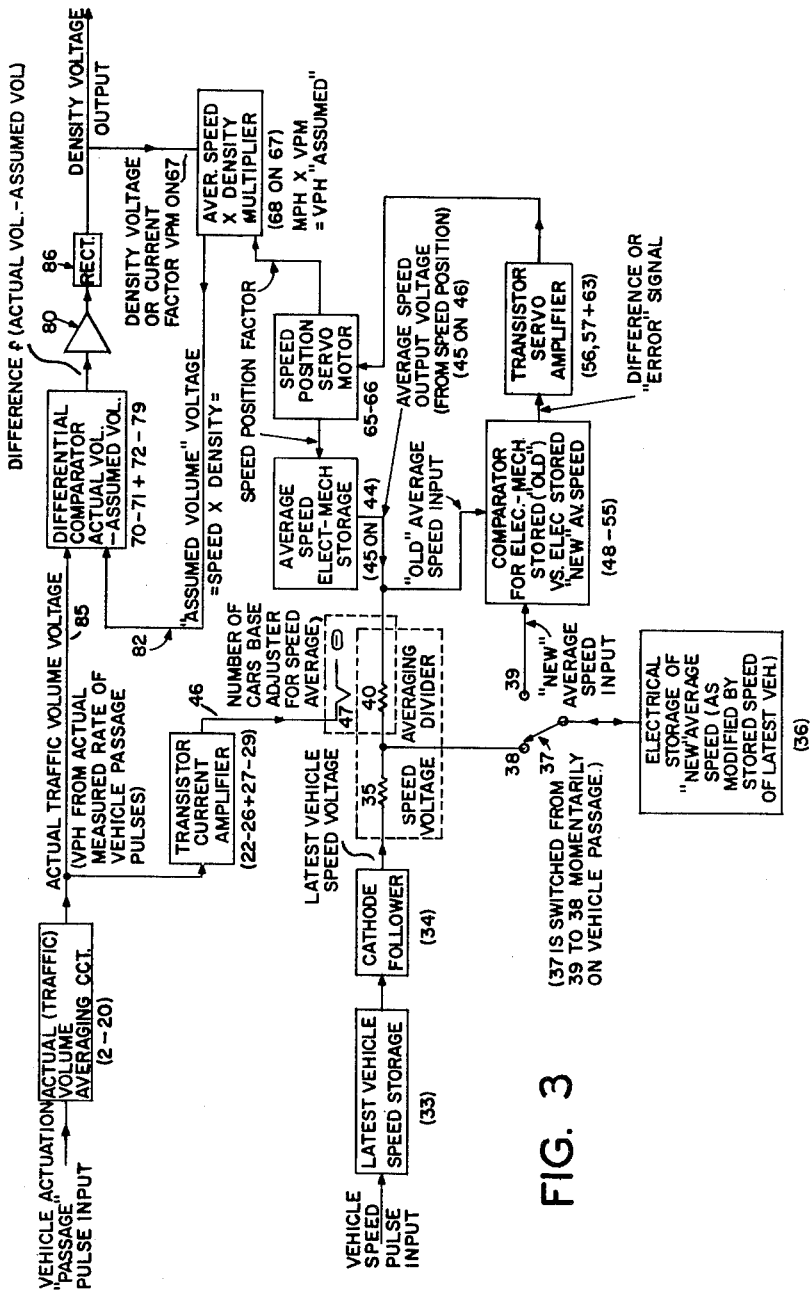
FIG. 3 is a block diagram of a preferred form of the invention corresponding to the schematic circuit diagram of FIG. 1.

In reference to FIG. 1, the passage of an individual vehicle beyond a point along a roadway is sensed at the vehicle detector switch 1 which may be in, above or alongside the roadway in various well known forms. Monostable multivibrator 2 is operated in response to such vehicle passage to provide a negative pulse output at 3 on the grid of the normally conducting pulse amplifier 4. Accordingly amplifier 4 is cut-off thereby raising the potential at the plate and across resistor 5 in a positive direction.

The positive pulse occurring at tap 6 provides a charging path for condenser 7 (two microfarads) and condenser 10 (one microfarad) in series from the tap at 6, through condenser 7, diode 8, and 100K ohm resistor 9 and condenser 10 to ground. A greater percentage of this pulse is developed across condenser 10 than across condenser 7 because of their relative size. Successive vehicles will successively increase the charge on condenser 10 to represent a greater number of vehicles.

However, since Traffic Volume is the number of vehicles passing a point per unit of time, it is desirable to introduce the time factor into the measurements; accordingly resistor 11 permits a slow discharge of condenser 10 during the period between vehicle actuations so that the voltage across condenser 10 is a function not only of the number of vehicles but also of their rate and is referred to as the instantaneous Traffic Volume. For example, if the vehicles flowing along the roadway are closely spaced, the voltage across condenser 10 will be greater than if they are spaced farther apart.

A traffic volume averaging circuit is provided including two fifteen megohm resistors 12 and 13 and a two microfarad condenser 14. This sixty second averaging circuit thus provides an average traffic volume voltage on line 15 which is connected to the grid of cathode follower 16. The cathode follower is ideally suited for its purpose of providing an output of the average traffic volume from line 15 since it has a high input impedance which does not substantially affect the long time constant of the averaging circuit.

Feedback is provided from the cathode resistor 17 via junction 20, through Zener diode 18 and diode 19 to junction 21 at the input of the volume circuit for a reason which will now be described.

Assume traffic volume is high; then the voltage across condensers 10 and 14 will be high.

The charging characteristics of condensers are non-linear since the charge on the condenser at any one time opposes any further charge; if the rate of flow of vehicles doubles or triples, the voltage across the condenser will not double or triple but will be substantially less. To correct this inaccuracy and thereby provide a linear measure of traffic volume, the feedback from the cathode of 16 provides a voltage at junction 21 which has a positive polarity to charge condenser 7 to this value which is additive with the vehicle input pulse at tap 6 to thereby raise the level of input voltage at junction 21. Thus as volume increases, the feedback voltage increases to raise the input voltage level so that the feedback voltage coupled with the positive passage pulse is always more positive than the charge on condenser 10 and 14 so that each passage pulse buckets a unit charge into condenser 10 independent of the volume level.

The selected Zener diode 18 in the preferred embodiment has a breakdown voltage in the reverse direction of 7.5 volts. Below this level the condenser charging circuit was greater than one (1) another charge path would In normal operation the volume level would generally be greater than 7.5 volts. Therefore the diode 18 is conducting in a reverse direction and provides a 7.5 volt drop in the feedback circuit. Thus the voltage at junction 21 is 7.5 volts less than the voltage at the cathode of 16 and junction 20. The effect of this voltage drop is that the overall amplifier gain with feedback is less than one. Thus regeneration is prevented. For example, if the gain of cathode follower 16 and the feedback circuit was greater than one (1) another charge path would be provided for condenser 10 through resistor 9, diode 8, diode 19 and Zener diode 18 to the cathode of 16. Thus the charge on 10 would be increased, thereby increasing the feedback voltage to further increase the charge on the condenser in a cyclic fashion resulting in saturation of the condenser for any traffic volume.

A significant advantage of the Zener diode circuit, is that it permits a range of instantaneous volume variations without permitting regeneration. For example, if the instantaneous volume level were to decrease suddenly, the average volume voltage would remain at its previous higher level for a short period of time since it is a slower acting circuit; in such a case the feedback voltage from the cathode 16 to junction 21 (without the Zener diode) would be greater than this new instantaneous volume and would therefore cause the instantaneous circuit to remain charged to its former level. However, by using the Zener diode the instantaneous volume voltages are permitted to vary over a range of values determined by the Zener diode before such regeneration can occur.

As will be shown subsequently a number of cars circuit including a thermistor correleates the speed measuring and volume measuring circuits. However, the thermistor is basically a non-linear device since its change in resistance is directly proportional to the heat generated in its filament but the heat generated in the filament is proportional to the square of the current through it.

Accordingly, to provide a linear correlation between speed and volume, the volume output is connected to the thermistor heater through a degenerative coupled transistor amplifier with a feedback circuit connected to provide a gain which varies inversely with the square root of input signal volumes.

The positive volume voltage at junction 20 is connected to the tap at resistor 22 through a tungsten filament lamp 23 which has a positive temperature coefficient. Resistor 24 in series with resistor 22 and lamp 23 form a voltage divider from source 25 to ground. The voltage on line 26 is coupled to the base of PNP transistor 27 whose emitter is grounded and whose collector is connected over line 28 to a source of negative power and the base of PNP transistor 29. The collector of transistor 29 is connected over line 46 to the heater 47 of the thermistor 40. The emitter of transistor 29 is connected to the junction of resistor 22 and lamp 23.

Now assume no feedback path exists and the traffic volume voltage at junction 20 increases. Normally, this increase in the positive voltage at the base of 27 causes it to decrease in conduction so that its collector rises in a negative direction; the increase in negative potential at the base of 29 causes it to increase its conduction so that the current along line 46 increases in proportion to the volume. In this case the heat generated in the filament of 47 would be proportional to the square of the traffic volume to provide a non-linear correlation of the speed and volume circuits. However, with the feedback path provided as the current flow of transistor 28 increases, it provides increased heating of the filament of lamp 23; this lamp has a positive temperature coefficient of resistance and accordingly provides an increased negative voltage drop across it which is coupled to the base of 27 as degenerative feedback to increase the conduction of transistor 27, and consequently tending to decrease or oppose the increase in conduction of transistor 29.

The positive coefficient of lamp 23 is non-linear so that for small volume voltages there is less degeneration and consequently a higher amplifier gain while for large traffic volume voltages there is more degeneration and a smaller amplifier gain. The result of such non-linear feedback therefore provides an output voltage or current from amplifier 29 which is proportional to the square root of the input traffic volume voltage. This output voltage or current is then connected over line 46 to the heater 47 so that the heat generated at 47 is proportional to the traffic volume.

*Speed determination*

Individual vehicle positive voltage speed pulses are applied at input terminal 30. These pulses may have a constant width and vary in voltage in proportion to speed or may be constant voltage pulses which vary in width in proportion to speed. In either event, condenser 33 is charged through diode 32 to store a voltage representing the speed of the last car. Subsequently the charge on condenser 33 is bucketed into condenser 36 through the cathode grid circuit of follower 34, resistor 35 and terminal 38 of switch 37. Accordingly the speed signals from successive vehicles are bucketed into condenser 36 so that the voltage on condenser 36 represents the average traffic speed.

Since it is desired that the average speed measurement be of the same vehicles within the volume measurement, a thermistor 40 is connected from junction 41 over lines 42 and 43 to a tap 45 on resistor 44 in which the voltage at the tap represents average traffic speed as will be shown subsequently. For example, if the Volume signal on line 46 indicates that five (5) vehicles have passed during the one minute (or some other time) time period, the voltage on line 46 will heat filament 47 sufficiently to vary the resistance of thermistor 40 with respect to resistance 35 so that the speed of an individual vehicle if different from the average speed will vary the average one-fifth of this difference. If the volume voltage on line 46 indicates ten vehicles in one minute, then an individual vehicle signal at 30 has only one-tenth of an effect on the average. The above operation occurs since resistors 35 and 40 form a series voltage divider between the cathode of 34 and tap 45; thus as the volume increases the number of cars within a sampling segment increases to heat thermistor 40 and decrease its resistance so that a vehicle pulse on the grid of follower 34 will have a smaller effect on the condenser 36 voltage than otherwise.

Switch 37 is normally in its right hand position connecting condenser 36 to junction 39. However the switch is thrown to the left for an instant whenever a vehicle passes by circuitry which is not shown but which may be associated with vehicle detector 1.

A chopper 48 having inputs 49 and 50 is connected to receive the average measured traffic speed at terminal 39 from condenser 36 and the assumed average speed at its terminal 50 from line 43. The chopper alternately connects to terminals 49 and 50 at a 60 rate for example so that any difference in voltage between these two points alternately charges and discharges condenser 51 through resistor 52. If the two voltages are the same the condenser charge maintains a steady state.

Accordingly any difference in voltage is applied to the grid of cathode follower 53 and developed across cathode resistor 54 through condenser 55 to the base of PNP transistor 56. The collector of 56 connects over line 58 to the base of 57. The emitter of 57 is connected to ground through parallel resistor and condenser 59 and resistor 60. The junction of 59 and 60 is connected over line 61 to the base of 56 to provide temperature compensation. For example, if the transistor 57 tends to conduct greater current flow with increase in temperature the voltage on line 61 goes more negative to increase conduction in 56 thereby so that the voltage on line 58 goes more positive to decrease conduction of 57.

The difference voltage output is fed through condenser 62 to a push pull amplifier 63 on line 64 to drive motor 65 to rotate shaft 66 to drive arms 45 and 68 to a point where the arm 45 represents the actual average traffic speed so that the output of the chopper 48 is zero and the system is balanced.

*Traffic density*

The circuitry for providing a measure of traffic density by effectively dividing traffic volume by traffic speed will now be described. The actual volume signal on line 85 is connected to diode 70. If the voltage on line 90 is assumed to be a measure of traffic density, then the potential at tap 68 on resistor 67 is a product of the assumed density and traffic speed which is therefore an assumed or trial traffic volume. This is the case since the voltage across resistor 67 is the density voltage on line 90, and the distance of tap 68 from the end of resistor 67 is proportional to speed, the tap 68 being mechanically coupled, by linkage (shaft) 66, to tap 45 on resistor 44, which is connected across a positive voltage supply as shown. The trial traffic volume is connected over line 82 to diode 71. An A.C. signal source 72 is connected from ground through resistor 73 to the common connection of the diodes 70 and 17.

The A.C. signal at 72 has several current paths; positive portions of the wave flow through resistor 73, capacitor 83, diode 70, line 85, resistor 17 to ground; negative portions of the wave flow through resistor 73, capacitor 83, diode 71, line 82, tap 68 on resistor 67 to ground. Resistors 17 and 67 are small (approx. 1000 ohms) in comparison with resistor 73 which is several megohms and capacitor 83 has very low impedance to A.C. so that the A.C. voltage at the junction of 73 and 74 is quite small when the diodes conduct. However, this A.C. voltage at the junction of resistors 73 and 74 increases as the voltage on line 85 increases over that on line 82. For example, assume a volume voltage on line 85 of 5 volts and a trial volume voltage on line 82 of 3 volts. Capacitor 83 will assume a charge across it of approximately 4 volts. As the positive half cycle of A.C. at source 72 occurs the voltage at the junction of resistors 73 and 74 will increase in a positive direction (diodes are not conducting) increasing the voltage at the junction of diodes 70 and 71. This increased voltage causes diode 70 to conduct when the voltage has increased sufficiently, in this example, one volt, thus limiting the increase of voltage at the junction of resistors 73 and 74 to one volt positive. Similarly, during the negative half cycle of A.C. at source 72 the voltage at the junction of resistors 73 and 74 will increase in a negative direction, decreasing the voltage at the junction of diodes 70 and 71. This decreased voltage causes diode 71 to conduct when the voltage has decreased sufficiently, in this example, one volt, thus limiting the decrease of voltage at the junction of resistors 73 and 74 to one volt negative. In this manner, the voltage at the junction of resistors 73 and 74 will be a clipped sine wave or essentially a square wave having a peak to peak level equal to the difference between the voltages at lines 85 and 82, in this case two volts.

Thus it should be noted that condenser 83 always assumes an average steady state voltage between the actual volume voltage on line 85 and the assumed volume voltage on line 82. Accordingly the voltage at the junction of resistors 73 and 74 swings positive and negative on both sides of this average value. The amount of this swing is directly proportional to the difference in voltage between these two signals. For example, if there is a large difference in voltage, 10 volts on line 85 and zero volts on line 82, condenser 83 will be initially charged to five volts and the voltage at the junction of 73 and 74 has a ten volt swing.

The positive and negative square waves pass through resistor 74 and condenser 75. The positive waves are passed to ground through diode 76 while the negative half waves pass through diode 77 and resistor 79. The negative variation across resistor 79 is thus directly proportional to the difference between the actual and assumed volumes. This difference is passed through condenser 81, transistor amplifier 80 and rectifier 86 to line 90.

The voltage on line 90 thus is the actual traffic density and provides a voltage across resistor 67 which is proportional to the difference between the actual and assumed volumes. If this difference is large, the large voltage on resistor 67, provides a large voltage at tap 68 and line 82 so that the voltage on line 82 is balanced with that on line 85.

Thus when the system is balanced the voltage on line 82 and tap 68 is proportional to the actual volume. Since the position of tap 68 is proportional to traffic speed and since actual traffic volume equals the product of traffic Density and Speed, the voltage on line 90 represents the actual traffic Density.

This Density voltage may be connected to a visual or graphic recorder or to a traffic controller.

One example of the use of the Density voltage output is to connect it to a classifier which has a plurality of circuits controlled by the density voltage to indicate one of a plurality of ranges of traffic density. Accordingly in FIG. 2 at the left of FIG. 1 there is shown one of such plurality of circuits.

This circuit includes three cascaded transistors 103, 104 and 105 in which 103 is a silicon type NPN while 104 and 105 are germanium type PNP transistors.

Each of the circuits has a negative bleeder supply including resistor 100 which normally biases 103 to only slight conduction. The density voltage on line 90 commonly connects to each of these circuits through their individual resistors 102 and 101 to the base of 103 and to the tap 106. Accordingly each of the circuits has its tap 106 adjusted to a different potential point but in all cases 103 is normally only slightly conducting. Thus when the density voltage is applied, transistor 103 of one of the circuits will start to conduct heavily before a similar transistor in one of the other circuits. In this manner, the plurality of circuits are adjusted to respond to different ranges of density.

Transistor 103 conducts when the positive density voltage on line 90 overcomes the negative voltage at tap 106; accordingly line 107 goes positive (less negative) and transistor 104 ceases to conduct. Thus the voltage on line 108 goes negative and transistor 105 conducts to energize relay 109. Diode 110 serves as a protection of the transistor against high voltages produced by the relay.

Accordingly relay 109 may be connected to a lamp or other indicator to show the range of density. The relays in the other circuits may be similarly connected.

The foregoing circuit is highly important in measuring equipment requiring great accuracy because it is substantially independent of temperature variations.

Variations in temperature cause varying amounts of collector to base leakage current to flow as is well known. Leakage current is substantially greater in germanium than in silicon transistors.

However by connecting the output of an NPN silicon emitter follower transistor 103 to the base input 114 of germanium transistor amplifier 104 these two leakage currents cancel each other. For example the collector to base leakage current of 104 is from the negative source 112, resistor 111, collector 113 to base 114; this provides a large negative potential on line 107 because the germanium has a large leakage. However, the leakage from collector 116 of the silicon transistor 103 is from a positive source 115.

While this leakage in 103 is small, the leakage effect at the emitter 117 and on line 107 is a large positive voltage because of the current gain of 103. Therefore the leakage effects are balanced and the potential on line 107 is substantially independent of temperature variations.

Having thus disclosed my invention from a preferred embodiment, numerous equivalent forms of my invention will be obvious to those skilled in the art upon reading the foregoing detailed disclosure. Accordingly my invention is defined in the following claims.

I claim:

1. Traffic density determining apparatus for vehicular traffic passing a detection point comprising
    means for measuring actual traffic volume, said means providing an electrical output signal representing the number of vehicles passing a detection point per unit time as averaged over a time period,
    means for measuring average traffic speed for a substantially corresponding number of vehicles, said speed averaging means providing an output representing average distance travelled per unit time for said vehicles,
    multiplier means receiving as inputs for combining two factors to provide a product of said factors as an electrical output signal,
    a comparator-amplifier circuit including a transistor amplifier and having two inputs for comparison to provide an amplifier electrical output proportional to the difference between the last named inputs,
    means for coupling said difference output to one of said inputs of said multiplier means,
    means for coupling said average speed output to the other input of said multiplier means,
    means for coupling said product electrical output signal to one of said inputs of said comparator-amplifier circuit,
    and means for coupling said actual volume output signal to the other input of said comparator-amplifier circuit,
    whereby said difference output will vary said product output fed back to the input of said comparator-amplifier circuit in the manner of a servo loop to substantially balance said inputs to said comparator-amplifier circuit, thereby providing by said product output a signal representing an assumed traffic volume computed as a product of the average speed factor and the difference output signal factor, with said product substantially equal to said actual volume signal and said difference signal output thus representing traffic density in number of vehicles per unit distance, and in which said speed averaging means includes:

a voltage divider circuit including a resistor and a thermistor, the relative resistances of which determine the degree to which the speed average output is modified by the speed of the latest vehicle to be included in the average speed and thus determine in effect the number of vehicles for which the average speed is determined, and said apparatus includes means including a transistor current amplifier incorporating degenerative feed-back to provide an electrical current output varying approximately with the square root of its input, electrical heater means coupled to said thermistor for varying the resistance thereof in square relation to the electrical current through said heater means, and said transistor current amplifier means having its input coupled to receive one of said volume output signals and having its output coupled into said heater means to supply current therefor whereby a substantially linear relation is obtained between the number of vehicles averaged in the speed signal and the volume signal.

2. Apparatus as in claim 1, and in which said transistor current amplifier includes two stages in common emitter configuration with the emitter of the second stage coupled back to the base of the first stage in a voltage divider circuit including a lamp filament having a positive temperature coefficient of resistance and connected as a return circuit for the emitter of said second stage.

References Cited by the Examiner

UNITED STATES PATENTS

| | | | |
|---|---|---|---|
| 2,103,490 | 12/1937 | Peterson | 330—110 |
| 2,532,231 | 11/1950 | Jarvis | 340—38 |
| 2,905,716 | 9/1959 | Larse | 235—196 |
| 2,933,716 | 4/1960 | Soderberg. | |
| 2,966,307 | 12/1960 | Schmid | 235—196 |
| 2,992,395 | 7/1961 | Rich | 330—110 |
| 2,999,999 | 9/1961 | Bartelink | 340—31 |
| 3,001,144 | 9/1961 | Dandl | 330—17 |
| 3,008,091 | 11/1961 | Van Overbeck | 330—17 |
| 3,024,443 | 3/1962 | Barker et al. | 340—31 |
| 3,024,999 | 3/1962 | Heacock | 235—196 |
| 3,030,608 | 4/1962 | Polster | 340—38 |

NEIL C. READ, *Primary Examiner.*

WALTER W. BURNS, *Examiner.*

C. L. WHITHAM, R. M. ANGUS, *Assistant Examiners.*